UNITED STATES PATENT OFFICE.

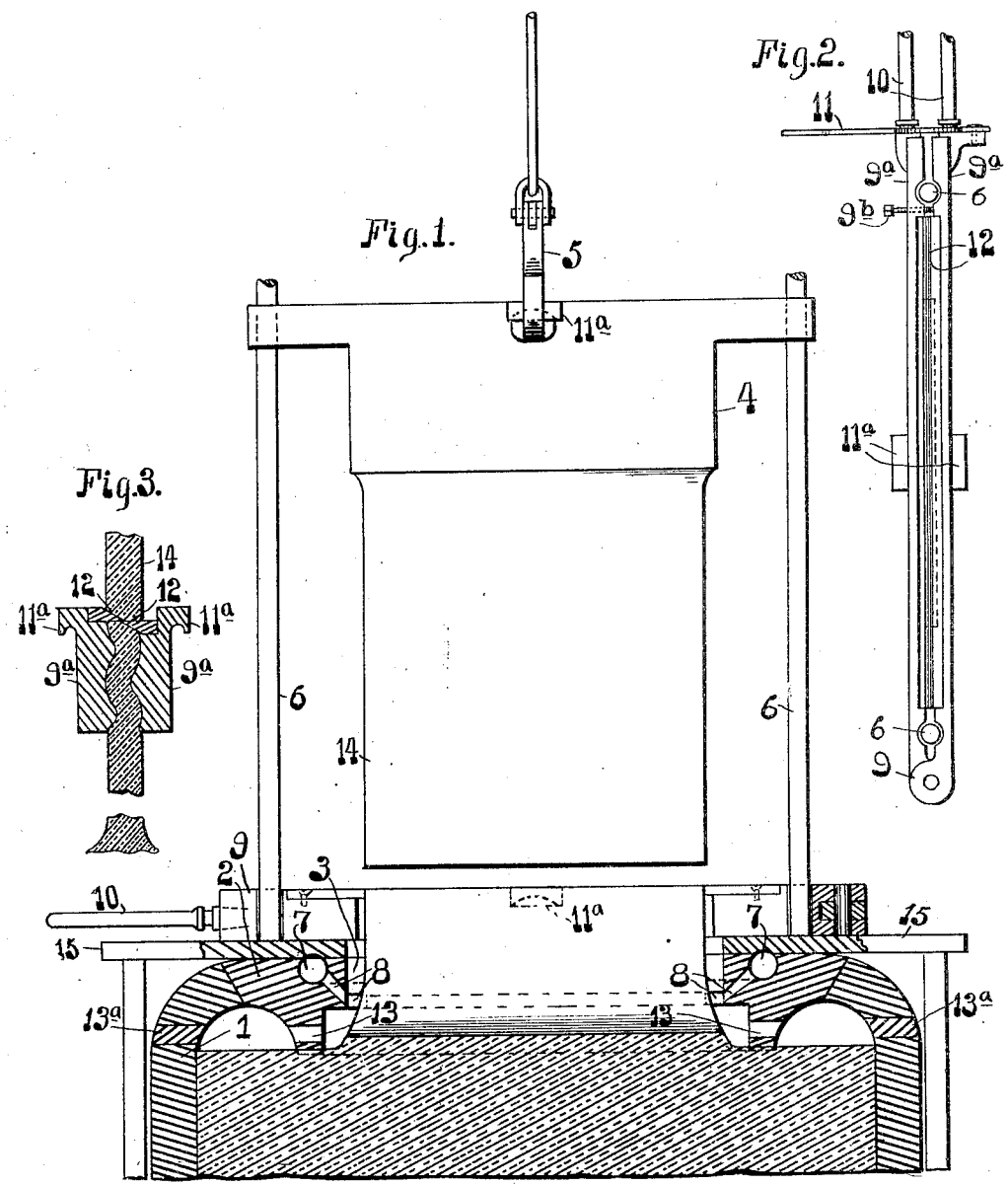

GEORGE H. HARVEY, OF GLENFIELD, PENNSYLVANIA, ASSIGNOR, BY MESNE ASSIGNMENTS, TO BROWNSVILLE GLASS COMPANY, OF PITTSBURG, PENNSYLVANIA, A CORPORATION OF PENNSYLVANIA.

GLASS-DRAWING MACHINE.

No. 813,291.

Specification of Letters Patent.

Patented Feb. 20, 1906.

Application filed April 13, 1903. Serial No. 152,302.

*To all whom it may concern:*

Be it known that I, GEORGE H. HARVEY, a citizen of the United States of America, and a resident of Glenfield borough, county of Allegheny, and State of Pennsylvania, have invented certain new and useful Improvements in Glass-Drawing Machines, of which the following is a specification.

In the accompanying drawings, Figure 1 is an elevation of my improved glass-drawing machine, the tank being shown in section. Fig. 2 is a plan view of a form of support. Fig. 3 is an enlarged vertical section through the support, showing the sheet of glass carried thereby, while Fig. 4 is a vertical section showing the support and shearing device made separate.

The purposes of my invention, generally stated, are to form sheet-glass directly from the tank, pot, or holder without the use of the highly-skilled labor heretofore required. I also provide means for the continuous drawing of the sheet, avoid delays in reheating the severed ends, and expedite and perfect the output.

I derive the above results preferably as follows, reference being had to the drawings, which are merely illustrative of the general principles of my invention: Glass in a semi-liquid state is contained in a proper tank, as indicated at 1 in the drawings, or any convenient receptacle. A refining-ring 2, suspended in and supported on the crown of tank 1, is provided with a proper orifice 3 for the admission of the lower end of the gathering-tool 4, which is shown as being operated in its downward and upward movements by tongs 5, interlocking in the lugs 11$^a$ of the gatherer and supported against tortional twist by the standards 6. The gatherer 4 can be either hollow, convex, concave, or, as shown, flat or of any other desired form without departing from my invention.

7 represents a flue extending, preferably, around all sides of the refining-ring 2, through which I may keep up a circulation of a cooling medium or fluid, which discharges through a series of ports 8, preferably at an obtuse angle to the path of the gathering movement. A series of ports 13, capable of being opened or closed, extend through the lower end of the refining-ring 2 and permit, if desired, the direct heat in the tank 1 to pass into the interior of the refining-ring and to superheat the refined portion of the glass contained therein. The ring is sealed around its lower edge, which prevents the scum from flowing from the surface of the liquid or semi-liquid glass into the ring portion.

13$^a$ 13$^a$ are movable plugs affording means for entering a rod or similar tool with a brick or its like to close or partly close the ports 13.

9 is a support or clamp and, as shown, consists of two members 9$^a$, preferably of an irregular-formed clamping-surface, an adjusting-nut 9$^b$, handles 10, a locking-lever 11, which closes over the contracted portion of the handles and by its contacting edge being grooved locks the handles.

12 12 are the knives for shearing the glass and can be attached to the clamps 9, as shown in Fig. 3, or they can be separate therefrom, as shown in Fig. 4.

There are a variety of substitutions that may be used in place of the clamps, but the principle in each case is the same—namely, the use which I will now describe—and such substitutions I consider within the purview of my invention.

Assuming the lower edge of the gatherer 4 to be immersed in the liquid or semiliquid glass a sufficient period of time to cause the glass to adhere thereto, the operator then causes it to rise at the proper predetermined speed required to cause the glass to harden in conjunction with a lower temperature maintained adjacent to its point of withdrawal from the ring. As shown in the drawings, the temperature is lowered at about the apex of the gather in the refining-ring—that is, at the point where the molten glass is chilled and drawn upwardly in sheet form. I do not limit myself to that particular point for cooling the glass or even the means here employed, for a jacket for a cooling circulation could extend partly to or up to the clamp or supporter, or a supplemental jacket containing a cooling medium could encircle the whole apparatus and still be within the scope of my invention. The gatherer 4 ascends with its sheet of glass 14, which now extends from the semiliquid glass in the tank to the predetermined height desired and which is of a consistency ranging from a brittle at the top to a plastic and then to a semiliquid state in the tank. Preferably the clamps 9 on table 15 are closed against the sides of the glass and the shear 12 then severs the glass reaching from tank 1 and supported by the clamp 9 from the sheet suspended above. The portion attached to the gatherer is carried to the leer or where desired. It is obvious that sheet-glass made in this manner requires less handling than when made in cylindrical form, which necessitates cutting, reheating, and flattening.

The clamps 9 could be dispensed with and the shear alone used. In that event the gatherer would have to descend into the glass for a gather for each sheet, but where a supporter is used to hold the lower portion of the severed sheet then the operation is as follows: As above described, after the upper portion of the glass has been sheared off and removed a second pair of tongs 5, if desired, are lowered and attached to lugs 11ª of the clamp 9 and raised, as before described, when a second pair of clamps 9 are attached to the glass and the portion above is sheared off and removed. The second pair of clamps are now raised with its dependent glass and a third set of clamps secured to the glass and the upper portion sheared off and removed. This operation may be repeated indefinitely or at least as long as any glass in workable condition remains in the tank.

It is apparent that sheet-glass made in this manner has not only the features mentioned before, but the further advantage also of being made, as it were, from a single strand of glass of uniform character, which prevents wrinkles, flaws, and air-bubbles, which are all liable to appear in the second draw of the glass from the tank if the dead or chilled end is permitted to fall back into the body of the glass in the tank after a sheet is drawn and severed.

What I claim is—

1. In the art of manufacturing glass, a receptacle adapted to contain glass in a liquid or semiliquid state, a refining-ring supported thereon, and means of communication between said receptacle and the interior of said refining-ring above the level of the glass.

2. In the art of manufacturing glass, a receptacle containing glass in a liquid or semiliquid form, a refining-ring supported thereon, an orifice in said refining-ring, and means in the ring for reducing the temperature of said orifice.

3. In the art of manufacturing glass, a receptacle adapted to contain glass in a liquid or semiliquid form, a refining-ring supported thereon, means of communication between said receptacle and the interior of the refining-ring above the level of the glass, and means for reducing the temperature in the orifice of said refining-ring.

Signed by me at Pittsburg, Pennsylvania, this 9th day of April, 1903.

GEORGE H. HARVEY.

Witnesses:
M. L. AVNER,
EMELINE RUTTER.